J. G. FRIBERG.
ADJUSTABLE NECK PAD AND CAP.
APPLICATION FILED JUNE 13, 1913.

1,126,441. Patented Jan. 26, 1915.

Witnesses
F. L. Gibson.
K. Peacock

Inventor
John G. Friberg.

By Victor J. Evans
Attorney

UNITED STATES PATENT OFFICE.

JOHN G. FRIBERG, OF MAIDEN ROCK, WISCONSIN, ASSIGNOR OF ONE-THIRD TO GEORGE E. BRASINGTON, OF MAIDEN ROCK, WISCONSIN, AND ONE-THIRD TO OSCAR H. ANDERSON, OF PLUM CITY, WISCONSIN.

ADJUSTABLE NECK-PAD AND CAP.

1,126,441. Specification of Letters Patent. Patented Jan. 26, 1915.

Application filed June 13, 1913. Serial No. 773,547.

*To all whom it may concern:*

Be it known that I, JOHN G. FRIBERG, a citizen of the United States, residing at Maiden Rock, in the county of Pierce and State of Wisconsin, have invented new and useful Improvements in Adjustable Neck-Pads and Caps, of which the following is a specification.

This invention has relation to adjustable neck pads and caps adapted to be applied to horse collars and it consists in the novel features hereinafter described and claimed.

An object of the invention is to provide an attachment for a horse collar of usual pattern which when applied to the collar will render the upper portion of the same flexible or pliable in order that it may fit snug and close against the pad at the upper portion of the neck of the animal.

The neck pad is provided with a metallic cap which is adapted to rest upon the upper portion of the pad which is interposed between the collar and the neck of the animal and which sustains the weight of the collar and the attached part. Means is provided for adjustably connecting the end portions of the collar with the said cap whereby the side portions of the collar may be properly adjusted around the neck of the animal and means is provided upon the said cap for retaining the hame strings against movement transversely of the collar and pad.

Figure 1:
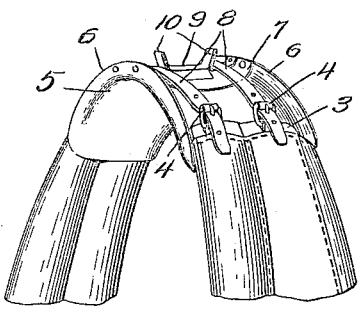
Figure 2:
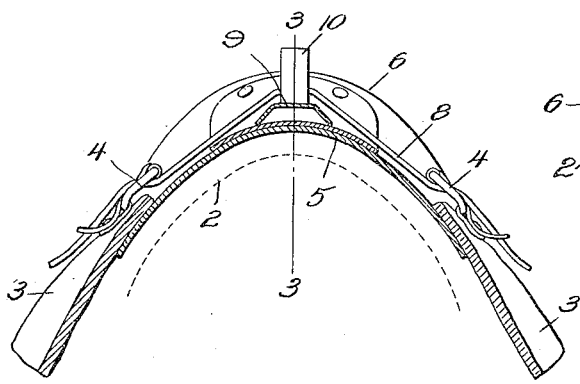
Figure 3:
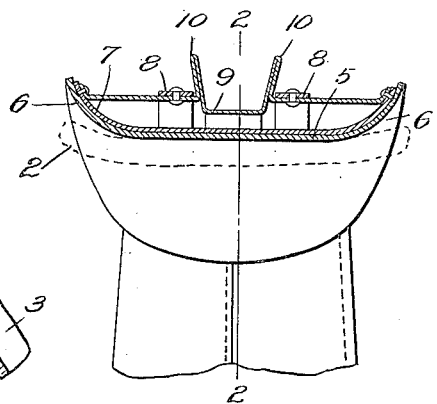
Figure 4:
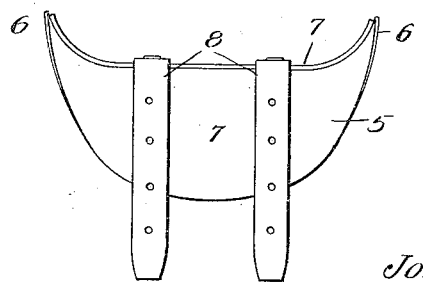

In the accompanying drawing:—Figure 1 is a perspective view of the adjustable neck pad and cap applied. Fig. 2 is a sectional view of the same. Fig. 3 is a similar view taken on the line 3—3 of Fig. 2. Fig. 4 is a side elevation of a slightly modified form of the device.

As illustrated in the accompanying drawing, the collar 1 is of the usual pattern and is adapted to be used in combination with a pad 2 of the usual pattern which is interposed between the inner surface of the collar and neck of the animal. To apply the combined neck pad and cap, the end portions of the collar 1 are opened and the stuffing is removed therefrom for a distance of approximately 3 to 5 inches from the ends of the collar. This leaves the end portions of the collar flexible or pliable. The sections 3 are secured by sewing or otherwise to the said flexible end portions of the collar 1 and the sections 3 are provided at their inner ends with buckles 4 or hooks or both. A metallic cap 5 is adapted to rest upon the intermediate portion of the pad 2 at top of the neck of the animal and is provided with upwardly curved forward and rear edges 6. A strip 7 extends transversely across the top of the cap 5 and is secured by rivets, screws or other securing devices to the upward curved edge portions 6 of the said cap. Straps 8 may be secured to the strip 7 and the end portions of the said straps 8 are adapted to engage the buckles 4 whereby the edge portions of the collar I may be adjustably connected together.

In the form of the invention as shown in Fig. 3 an additional cross strip 9 is provided. This strip is located on top of the strip 7 and the end portions of the strip 9 are spaced from the end portions of the said strip 7. Straps 8 are secured to the end portions of the strip 9 by means of rivets which pass transversely through the said strips. At its interminate portion the strip 9 is provided with upwardly disposed lugs 10 which are spaced from each other and which are formed by bending the metal of the said strip 9 into upwardly disposed poles. These lugs 9 are adapted to receive between them hame strings whereby the hames are prevented from moving transversely of the collar 1 when the parts are in position upon the neck of the animal.

Having thus described the invention what is claimed as new is:—

A pad comprising a cap having upwardly disposed front and rear edge portions, a strip secured at its ends to the said upwardly disposed edge portions of the cap and bringing the space between said upwardly disposed portions and having at intermediate points upwardly disposed spaced lugs formed thereon and straps secured to the strip beyond the outer sides of the lugs and arranged to be adjustably connected with collar sections.

In testimony whereof I affix my signature in presence of two witnesses.

JOHN G. FRIBERG.

Witnesses:
F. W. CARPENTER,
JOHN A. JOHNSON.